United States Patent
Cao et al.

(10) Patent No.: US 9,105,053 B2
(45) Date of Patent: Aug. 11, 2015

(54) METHOD AND APPARATUS FOR DETERMINING A USER AGE RANGE

(75) Inventors: Yang Cao, Beijing (CN); Feng Ding, Beijing (CN); Jilei Tian, Beijing (CN)

(73) Assignee: Nokia Technologies Oy, Espoo (FI)

( * ) Notice: Subject to any disclaimer, the term of this patent is extended or adjusted under 35 U.S.C. 154(b) by 392 days.

(21) Appl. No.: 13/634,811

(22) PCT Filed: Mar. 23, 2010

(86) PCT No.: PCT/CN2010/071205
§ 371 (c)(1),
(2), (4) Date: Sep. 13, 2012

(87) PCT Pub. No.: WO2011/116514
PCT Pub. Date: Sep. 29, 2011

(65) Prior Publication Data
US 2013/0013308 A1    Jan. 10, 2013

(51) Int. Cl.
*G06F 17/28* (2006.01)
*G06F 17/20* (2006.01)
(Continued)

(52) U.S. Cl.
CPC ........ *G06Q 30/0271* (2013.01); *G06Q 30/0267* (2013.01)

(58) Field of Classification Search
CPC . G06F 17/2785; G06F 17/2735; G10L 15/16; G10L 15/22; G10L 15/20; G10L 15/265; G10L 15/02; G10L 15/142; G10L 15/10; G10L 15/00; G10L 15/08; G10L 15/12; G10L 15/063; G10L 15/30; G10L 17/005; G10L 17/02; G10L 19/0212; G10L 19/005; G10L 19/10; G10L 19/12; G10L 21/04; G10L 21/0208; G10L 25/90; G10L 25/93; G10L 25/78; G10L 17/2785; G10L 27/2735
USPC ........... 704/237, 256.1–256.5, 270, 244–246, 704/273, 233, 257, 5, 260, 230, 238, 277, 704/235, 205, 275; 707/804
See application file for complete search history.

(56) References Cited

U.S. PATENT DOCUMENTS 5,506,933 A * 4/1996 Nitta .............................. 704/256
5,960,397 A * 9/1999 Rahim .......................... 704/244
(Continued)

FOREIGN PATENT DOCUMENTS

KR    20020007780 A    1/2002

OTHER PUBLICATIONS

Hubeika, "Estimation of Gender and Age", Proc. ACM Student Research competition 2006, http://www.fit.vutbr.cz/~cernocky/publi/2006/104Hubeika.pdf.*
(Continued)

*Primary Examiner* — Pierre-Louis Desir
*Assistant Examiner* — Anne Thomas-Homescu
(74) *Attorney, Agent, or Firm* — Ditthavong & Steiner, P.C.

(57) ABSTRACT

An approach is provided for determining a user age range. An age estimator causes, at least in part, acquisition of voice data. Next, the age estimator calculates a first set of probability values, wherein each of the probability values represents a probability that the voice data is in a respective one of a plurality of predefined age ranges, and the predefined age ranges are segments of a lifespan. Then, the age estimator derives a second set of probability values by applying a correlation matrix to the first set of probability values, wherein the correlation matrix associates the first set of probability values with probabilities of the voice data matching individual ages over the lifespan. Then, the age estimator, for each of the predefined age ranges, calculates a sum of the probabilities in the second set of probability values corresponding to the individual ages within the respective predefined age ranges. Further, the age estimator determines the predefined age range to associate with the voice data based, at least in part, on the calculated sums of the probabilities.

20 Claims, 9 Drawing Sheets

(51) Int. Cl.

| | | |
|---|---|---|
| *G06F 17/27* | (2006.01) | |
| *G06F 17/21* | (2006.01) | |
| *G10L 15/00* | (2013.01) | |
| *G10L 17/00* | (2013.01) | |
| *G10L 21/00* | (2013.01) | |
| *G10L 25/00* | (2013.01) | |
| *H04M 11/00* | (2006.01) | |
| *G06F 7/00* | (2006.01) | |
| *G06F 17/22* | (2006.01) | |
| *G06F 17/30* | (2006.01) | |
| *G06Q 30/02* | (2012.01) | |
| *G06F 17/25* | (2006.01) | |
| *G06F 17/26* | (2006.01) | |
| *G06F 3/00* | (2006.01) | |
| *G06F 3/048* | (2013.01) | |
| *G06F 3/16* | (2006.01) | |

(56) References Cited

U.S. PATENT DOCUMENTS

| | | | |
|---|---|---|---|
| 6,112,175 A * | 8/2000 | Chengalvarayan | 704/256.5 |
| 7,720,683 B1 * | 5/2010 | Vermeulen et al. | 704/254 |
| 8,676,586 B2 * | 3/2014 | Wasserblat et al. | 704/270 |
| 8,676,740 B2 * | 3/2014 | Ueki | 706/52 |
| 2002/0095295 A1 * | 7/2002 | Cohen et al. | 704/275 |
| 2002/0135618 A1 * | 9/2002 | Maes et al. | 345/767 |
| 2003/0018475 A1 * | 1/2003 | Basu et al. | 704/270 |
| 2004/0054531 A1 * | 3/2004 | Asano | 704/231 |
| 2005/0075863 A1 * | 4/2005 | Jiang et al. | 704/205 |
| 2005/0102139 A1 * | 5/2005 | Fukada | 704/235 |
| 2005/0119883 A1 * | 6/2005 | Miyazaki et al. | 704/231 |
| 2005/0149337 A1 * | 7/2005 | Asadi et al. | 704/277 |
| 2005/0182626 A1 * | 8/2005 | Kim et al. | 704/245 |
| 2006/0111904 A1 * | 5/2006 | Wasserblat et al. | 704/246 |
| 2006/0143006 A1 * | 6/2006 | Asano | 704/238 |
| 2006/0178877 A1 * | 8/2006 | Jiang et al. | 704/230 |
| 2006/0184800 A1 * | 8/2006 | Rosenberg | 713/186 |
| 2006/0193671 A1 * | 8/2006 | Yoshizawa et al. | 400/208 |
| 2006/0235692 A1 * | 10/2006 | Mukhtar et al. | 704/260 |
| 2007/0162283 A1 * | 7/2007 | Petrushin | 704/255 |
| 2008/0059147 A1 * | 3/2008 | Afify et al. | 704/5 |
| 2008/0154609 A1 * | 6/2008 | Wasserblat et al. | 704/273 |
| 2008/0235016 A1 * | 9/2008 | Paul et al. | 704/246 |
| 2008/0243506 A1 * | 10/2008 | Sakai et al. | 704/256.4 |
| 2008/0298562 A1 * | 12/2008 | Ju et al. | 379/88.18 |
| 2009/0012785 A1 * | 1/2009 | Chengalvarayan | 704/231 |
| 2009/0175424 A1 * | 7/2009 | Andrassy et al. | 379/88.02 |
| 2010/0324909 A1 * | 12/2010 | Runge et al. | 704/270 |
| 2011/0035215 A1 * | 2/2011 | Sompolinsky et al. | 704/231 |
| 2011/0077944 A1 * | 3/2011 | Seshadri | 704/257 |
| 2011/0224979 A1 * | 9/2011 | Raux | 704/233 |
| 2012/0150545 A1 * | 6/2012 | Simon | 704/270 |
| 2012/0331137 A1 * | 12/2012 | Olsen et al. | 709/224 |
| 2013/0132091 A1 * | 5/2013 | Skerpac | 704/273 |
| 2013/0151254 A1 * | 6/2013 | Seshadri | 704/256.1 |

OTHER PUBLICATIONS

Hubeika et al., "Maximum Likelihood and Madximum Mutual Information Training in Gender and Age Recognition System", V. Matouˇsek and P. Mautner (Eds.): TSD 2007, LNAI 4629, pp. 496-501, 2007.*

Extended European Search Report for Corresponding Application No. 10848176.3-1958, dated Aug. 19, 2013.

* cited by examiner

METHOD AND APPARATUS FOR DETERMINING A USER AGE RANGE

RELATED APPLICATION

This application was originally filed as PCT Application No. PCT/CN2010/071205 filed Mar. 23, 2010.

BACKGROUND

Service providers and device manufacturers (e.g., wireless, cellular, etc.) are continually challenged to deliver value and convenience to consumers by, for example, providing compelling network services. One area of development has been customizing services, content, communications (e.g., marketing, advertisements), etc. according to user characteristics to make such services more effective or relevant to the individual user. It is noted that of the many characteristics associated with a user, age is one of the most important distinguishing features for targeting services. A number of services can benefit from knowing a user's age. For example, an advertisement targeted to a properly matched age group can greatly improve the click through rate. However, obtaining age information from users is a significant challenge. Users are often reluctant to provide this information because they may believe it is too personal to give out freely, or users may simply be jaded or tired of providing registration and related information. Accordingly, service providers and device manufacturers face significant technical challenges to enabling accurate and efficient determination of a user's age while reducing or eliminating any data input burden imposed on the user.

SOME EXAMPLE EMBODIMENTS

Therefore, there is a need for an approach for accurately and automatically determining a user age range.

According to one embodiment, a method comprises causing, at least in part, acquisition of voice data. The method also comprises calculating a first set of probability values, wherein each of the probability values represents a probability that the voice data is in a respective one of a plurality of predefined age ranges, and the predefined age ranges are segments of a lifespan. The method also comprises deriving a second set of probability values by applying a correlation matrix to the first set of probability values, wherein the correlation matrix associates the first set of probability values with probabilities of the voice data matching individual ages over the lifespan. The method also comprises, for each of the predefined age ranges, calculating a sum of the probabilities in the second set of probability values corresponding to the individual ages within the respective predefined age ranges. The method further comprises determining the predefined age range to associate with the voice data based, at least in part, on the calculated sums of the probabilities.

According to another embodiment, an apparatus comprising at least one processor, and at least one memory including computer program code, the at least one memory and the computer program code configured to, with the at least one processor, cause, at least in part, the apparatus to cause, at least in part, acquisition of voice data. The apparatus is also caused to calculate a first set of probability values, wherein each of the probability values represents a probability that the voice data is in a respective one of a plurality of predefined age ranges, and the predefined age ranges are segments of a lifespan. The apparatus is also caused to derive a second set of probability values by applying a correlation matrix to the first set of probability values, wherein the correlation matrix associates the first set of probability values with probabilities of the voice data matching individual ages over the lifespan. The apparatus is also caused, for each of the predefined age ranges, to calculate a sum of the probabilities in the second set of probability values corresponding to the individual ages within the respective predefined age ranges. The apparatus is further caused to determine the predefined age range to associate with the voice data based, at least in part, on the calculated sums of the probabilities.

According to another embodiment, a computer-readable storage medium carrying one or more sequences of one or more instructions which, when executed by one or more processors, cause, at least in part, an apparatus to cause, at least in part, acquisition of voice data. The apparatus is also caused to calculate a first set of probability values, wherein each of the probability values represents a probability that the voice data is in a respective one of a plurality of predefined age ranges, and the predefined age ranges are segments of a lifespan. The apparatus is also caused to derive a second set of probability values by applying a correlation matrix to the first set of probability values, wherein the correlation matrix associates the first set of probability values with probabilities of the voice data matching individual ages over the lifespan. The apparatus is also caused, for each of the predefined age ranges, to calculate a sum of the probabilities in the second set of probability values corresponding to the individual ages within the respective predefined age ranges. The apparatus is further caused to determine the predefined age range to associate with the voice data based, at least in part, on the calculated sums of the probabilities.

According to another embodiment, an apparatus comprises means for causing, at least in part, acquisition of voice data. The apparatus also comprises means for calculating a first set of probability values, wherein each of the probability values represents a probability that the voice data is in a respective one of a plurality of predefined age ranges, and the predefined age ranges are segments of a lifespan. The apparatus also comprises deriving a second set of probability values by applying a correlation matrix to the first set of probability values, wherein the correlation matrix associates the first set of probability values with probabilities of the voice data matching individual ages over the lifespan. The apparatus also comprises, for each of the predefined age ranges, calculating a sum of the probabilities in the second set of probability values corresponding to the individual ages within the respective predefined age ranges. The apparatus further comprises means for determining the predefined age range to associate with the voice data based, at least in part, on the calculated sums of the probabilities.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining a user age range are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
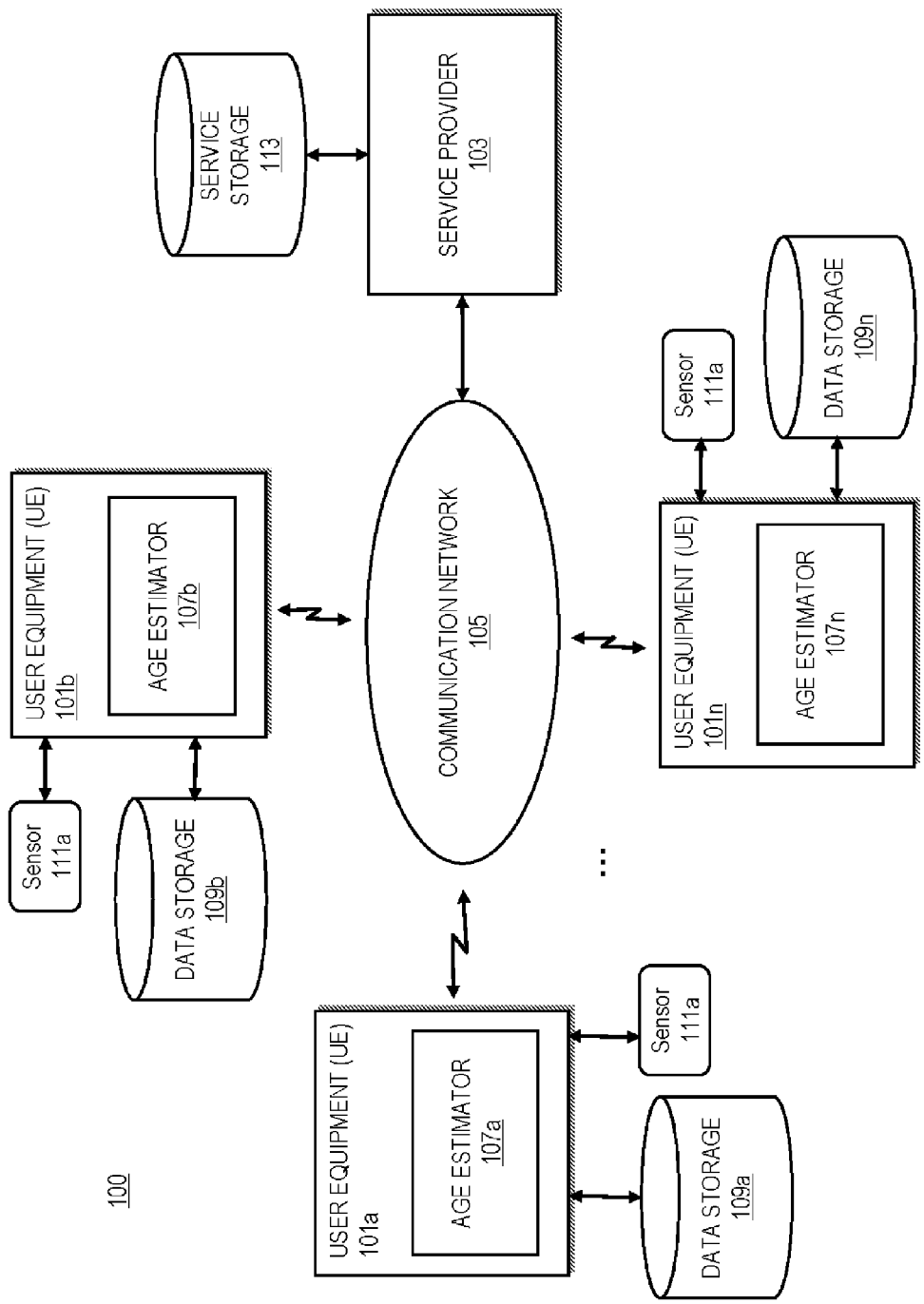
FIG. 1 is a diagram of a system capable of determining a user age range, according to one embodiment.

FIG. 1 is a diagram of a system capable of determining a user age range, according to one embodiment. As discussed previously, applications and services that are directed to targeted users or groups of users often rely on the age of the user as an important factor for providing effective services. In other words, users of different ages may be interested in different services. For example, advertisements, content, applications, etc. are typically designed for specific ages and demographics. In one example, children may be interested in hearing about services regarding Saturday morning cartoons, whereas adults may be interested in hearing about the stock market. Thus, knowing the user's age range may help provide user specific services. Further, advertisements may be sent out in an age-specific manner such that the user's device is not burdened with a flood of irrelevant advertisements for the user's age range. In addition, some services require the user to be in a certain age range (e.g. over 10 years old of age for information about violent movies).

The user's age may be determined by considering various aspects of the user. One aspect of the user that affects the age is a voice of the user. In particular, the user's voice changes throughout the lifespan of the user and thus is closely associated with the user's age. For example, a child's voice may have a different pitch than a teenager's voice, and an elderly person's voice may have a different consistency than a young adult's voice. Hence, analyzing user's voice may lead to approximating the user's age. Further, data related to the user's voice can be easily obtained. With increasing use of mobile phone in voice communication, a large amount of the user's voice data can be collected because users generally spend time talking on their respective mobile phones daily. Thus, it is desirable to collect data related to the user's voice and analyze such data, at least because the voice data is readily available.

However, it is generally difficult to pinpoint the individual's accurate age by listening to the user's voice. Thus, it may also be difficult to compute an accurate age of the user from the user's voice. Nonetheless, instead of the user's age, a range of the user's age may be approximated according to the user's voice, instead of the user's age. The range of the user's age may provide sufficient information for service providers because the service providers are often interested in a range of the age that the user belongs to, rather than a specific age. Although a user's voice may be easily collected by acquiring the user's voice whenever the user speaks to a microphone-equipped device (e.g. a mobile phone), it remains technically difficult and challenging to generalize an approach for estimating age based on voice data.

To address this problem, a system 100 of FIG. 1 introduces the capability to acquire voice data of a user, to analyze the voice data in order to calculate probability that the user's voice is within a predefined age range, and to determine the predefined age range that matches most closely with the user's voice. The voice data may be captured by the sensor 111 connected to the UE 101 and be stored in the data storage 109 connected to the UE 101. More specifically, the system 100 enables the UE 101 to calculate a first set of probability values representing the probability that the user's voice is in respective predefined age ranges based on a model, and to calculate a second set of probability values for each individual age over a life span by applying a correlation matrix to the first set of probability values. Then, the UE 101 calculates a sum of the probabilities in the second set of probability values within the respective predefined age ranges. Based on these sums corresponding to the predefined age ranges, the UE 101 determines the age range that is most closely associated with the user's voice. For example, the predefined age range corresponding to the highest sum of probabilities can be identified as the range associated with the voice data.

In one embodiment, the target age range may be specified, either by a user or a service provider 103. For example, the target age range may be specified by a service provider 103 providing a service (e.g., a service available in the service storage 113) targeted at a specific age group. Then, the UE 101 can calculate a sum of the probabilities in the second set of probability values within the specified target age range. The UE 101 determines whether the sum is sufficiently high for the target age range. The service may be provided according to this determination.

By way of example, the model used for determining the first set of probability values may be built using speech training data. The speech training data may be voice samples collected for each predefined age range, such that the model can be trained to produce accurate probabilities when the actual user's voice data is used with the model. A predetermined number of samples for each predefined age range can be collected for the model to achieve a desired accuracy. Further, the correlation matrix used for calculating the second set of probability values may also be trained, considering all constraints from the speech training data, such that elements of the trained correlation matrix denote the probabilities of the predefined age ranges falling into individual ages.

Therefore, an advantage of this approach is that, by analyzing a user's voice data, the age range of the user can be automatically determined. The trained model and correlation matrix also improve the accuracy of the determination of the user's age range. According to the age range determination, additional services, content, advertising, personalization options, recommendations, etc. can be targeted to the user that may be of relevance or interest to the user. Thus, this targeting reduces the amount of unwanted or irrelevant information that is transmitted or offered to the user. Therefore, this approach may also advantageously reduce the bandwidth, memory, and computational resources associated with the transmission. Further, services or communications not suitable for the user due to the user's age can be filtered out based on the user's age range. Therefore, means for determining a user age range are anticipated.

As shown in FIG. 1, the system 100 comprises a user equipment (UE) 101 having connectivity to the age estimator 107 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UE 101 and the service provider 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
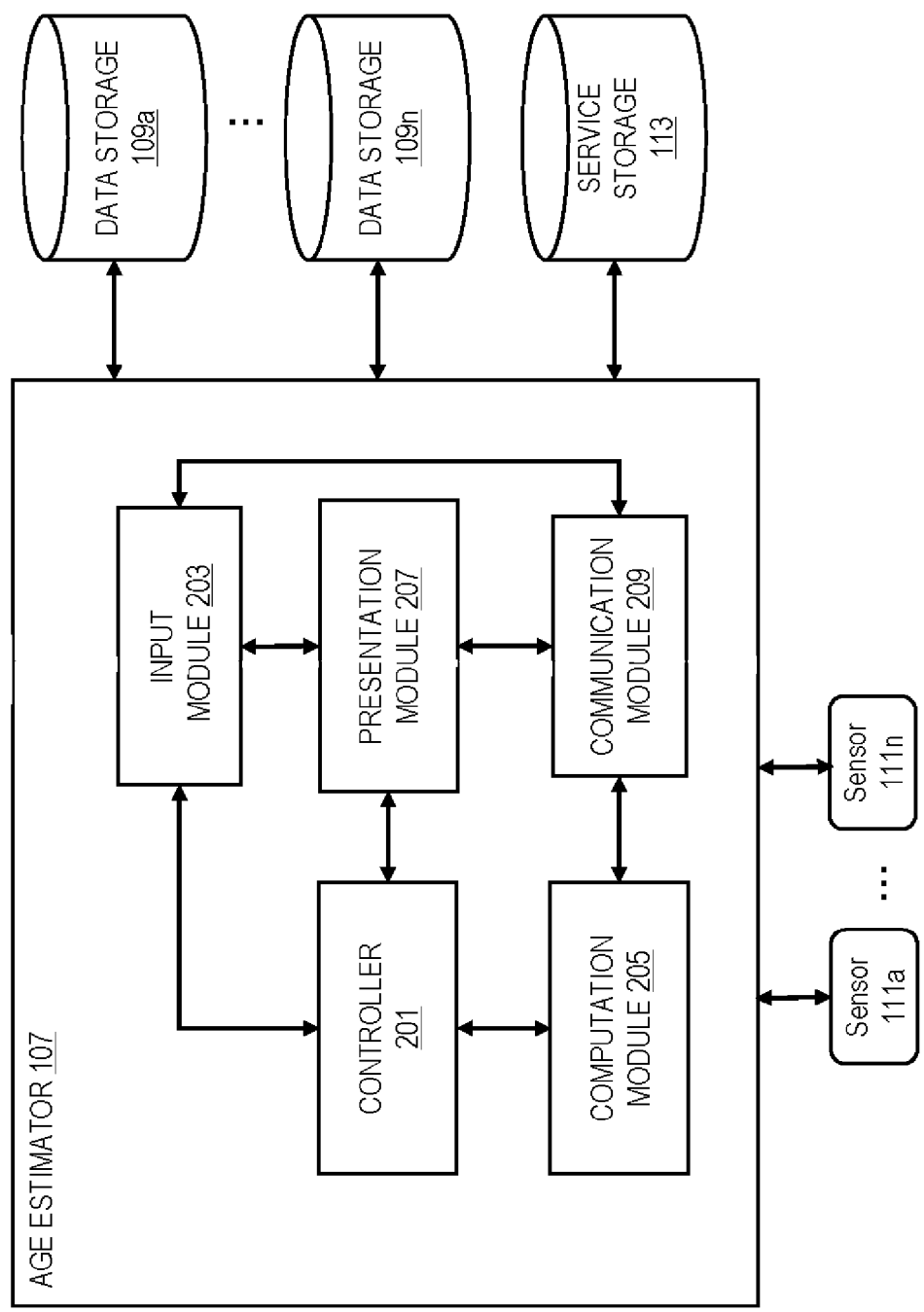
FIG. 2 is a diagram of the components of an age estimator, according to one embodiment.

FIG. 2 is a diagram of the components of an age estimator 107, according to one embodiment. By way of example, the age estimator 107 includes one or more components for determining a user age range. It is contemplated that the functions of these components may be combined in one or more components or performed by other components of equivalent functionality. In this embodiment, the age estimator 107 includes a control module 201, an input module 203, a computation module 205, a presentation module 207 and a communication module 209. The control module 201 oversees tasks, including tasks performed by the input module 203, the computation module 205, the presentation module 207 and the communication module 209. The computation module 205 performs computations and estimations that are used to determine a person's age based on voice data. The computation module 205 takes the voice data acquired by the sensor 111 and stored in the data storage 109, and computes a probability that the voice data belongs to each predefined age range. For example, the computation module 205 calculates a first set of probability values, wherein each of the probability values represents a probability that the voice data is in a respective one of the predefined ranges. The predefined age ranges are segments of a life span, each segment including a range of ages, and may be defined automatically or by a user. Then, the computation module 205 derives a second set of probability values by applying a correlation matrix to the first set of probability values. The correlation matrix associates the first set of probability values with probabilities of the voice data matching individual ages over the life span. Each element of the correlation matrix may represent a probability that one of the predefined age ranges falls into one of the individual ages over the life span. Further, the computation module 205 calculates, for each of the predefined age ranges, a sum of the probabilities in the second of probability values corresponding to the individual ages within the respective predefined ages. Then, the computation module 205 determines the predefined age range to associate with the voice data based on the calculated sums of the probabilities.

The computation module 205 may use a statistical model such as Gaussian mixture model (GMM), an artificial neural network, a support vector model, a decision tree, or a combination thereof in calculating the first set of probability values and/or the second set of probability values. Thus, the correlation matrix may be computed using one or more of the statistical models including Gaussian mixture model (GMM), an artificial neural network, a support vector model, and a decision tree.

The input module 203 may collect voice data as well as other data including biometric information and contextual information. The communication module 209 manages incoming and outgoing communications and may control storing the incoming or outgoing voice data in the data storage medium 109 or the service storage medium 113. The communication module 209 may also collect information regarding communicating parties, forms of communication, communication time, and any other information related to the communication, such that this information may be used as the contextual information. The presentation module 207 controls display of a user interface such as graphical user interface, to convey information and to allow user to interact with the UE 101 via the interface. Further, the presentation module 207 interacts with the control module 201, the input module 203 and the communication module 209 to display any necessary information that needs to be conveyed, such as the predefined age ranges, estimated age range, probabilities for each age range or each individual age, as well as a profile and details on the predefined age ranges.

In one embodiment, the input module 203 may receive an input specifying a target age range. Based on this input, the computation module 205 may calculate a sum of probabilities in the second set of probability values corresponding to the individual ages within the target age range. Then, the computation module 205 determines whether the voice data is associated with an age with the target age range, based on the sum. The voice data may be associated with an age with the target age range, if the sum of the probability values is sufficiently high (e.g. passes a certain minimum probability value threshold).

Further, the training samples may be acquired by the sensor 111 or a server (not shown), so as to train the statistical model and the correlation matrix. The training samples may also be stored in the data storage 109 of the UE 101. The computation module 205 trains the statistical model by identifying each of the voice data of the training samples according to the predefined age ranges and the individual ranges in the life span. Then, the computation module 205 calculates a reference set of probability values for correlating the voice data with the predefined age ranges. The computation module 205 also trains the correlation matrix by calculating the correlation matrix based on the voice data of the training samples.

The UE 101 may also be connected to storage media such as the data storage media 109a-109n such that the age estimator 107 can access data or store data in the data storage media 109a-109n. If the data storage media 109a-109n are not local, then they may be accessed via the communication network 105. The UE 101 may also be connected to the service storage medium 113 via the communication network 105 such that the age estimator 107 may be able to control the data in the service storage medium 113 and store and access data in the service storage medium 113.

Figure 3:
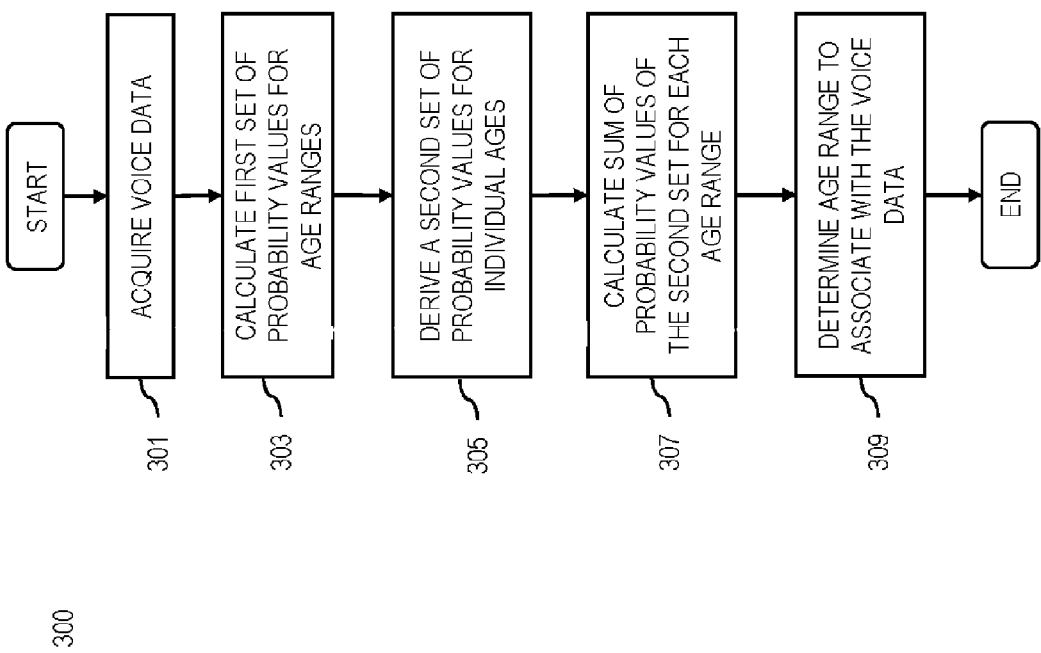
FIG. 3 is a flowchart of a process for determining a user age range, according to one embodiment.

FIG. 3 is a flowchart of a process for determining a user age range, according to one embodiment. In one embodiment, the age estimator 107 performs the process 300 and is implemented in, for instance, a chip set including a processor and a memory as shown FIG. 8. In step 301, the age estimator 107 has the UE 101 acquire the voice data. The voice data may be acquired via the sensor 111 of the UE 101. The sensor 111 may be a device that can acquire voice data, such as a microphone. The acquired voice data may be stored in the data storage 109 such that the stored voice data may be used for computation later. For example, a collection of voice data may be compiled during a certain period of time and stored in the data storage 109. Further, the voice data may be weighed depending on the time of acquisition. For example, the voice data acquired a long time ago may not be as accurate of a representation of the user's age as the voice data acquired recently, and thus weights may be applied accordingly. In step 303, the age estimator 107 calculates the first set of probability values. Each of the probability values in the first set represents a probability that the voice data is in a corresponding predefined age range. For example, if the age ranges include Children (0-15 years old), Teenager (16-20 years old), Young Adult (21-30 years old), Older Adult (31-45 years old), Senior (46-60 years old) and Elderly (60-130 years old), the age estimator 107 calculates probabilities for each of these six age ranges, which consists the first set of probabilities.

After the first set of probabilities is calculated, in step 305, the age estimator 107 derives a second set of probability values by applying a correlation matrix to the first set of probability values. Applying the correlation matrix to the first set of probability values associate the first set of probabilities with the probabilities of the voice data matching individual ages over a life span. Thus, the result of step 305 is a second set of probabilities having probability values for all of the individual ages in the life span. For example, if the entire life span is defined to be 0-130 years old, then the result of step 305 is a second set of probabilities having 131 probability values corresponding to 0-130 years. The correlation matrix may be created such that each element of the correlation matrix represents a probability that one of the predefined age ranges falls into one of the individual ranges. For example, a correlation matrix for six predefined age ranges and a life span of 0-130 years would be a 6×131 matrix, with six rows representing the six predefined age ranges and 131 columns representing the life span of 0-130 years.

Then, the sum of the probability values of the second set for each of the predefined age ranges is calculated (step 307). For example, for the age range 0-15 years old, the sum of sixteen probability values from the second set corresponding to the ages 0-15 is calculated, in order to find a probability value for the age range 0-15 years old. The sums calculated for corresponding age ranges are the final probability values for the corresponding age ranges. Thus, based on these calculated sums of the probability values, the age estimator 107 determines the predefined age range to associate with the voice data, as shown in step 309.

When the predefined age range to associate with the voice data is determined, this information may be used for more specified provision of services. For example, if the user requests services, the services based on this age range is provided to the UE 101. Further, some services may be blocked from being provided to the user, if the user's age range does not correspond with the required age range for the service (e.g. movie services for people over 12 years old). Further, social networking services may be able to recommend activities or friends based on this determined age range. As another example, when a service is provided to the various UEs 101a-101n, the age ranges corresponding to the UEs 101a-101n may be reported to the service provider of the service. This report may show that this specific service is popular with certain age groups. Then, based on this report, the service provider may target the popular age groups.

Although various embodiments are described with respect to using voice data to deter a user's age range, it is contemplated that the process 300 of FIG. 3 may be performed using one or more other types of biometric information in place of or in combination with the voice data. By way of example, the biometric information may include the person's face or skin, bio-signals such as brainwaves and a heartbeat and etc. which may be used to estimate the person's age, and collected via the sensor 111. Further, light (e.g. infra-red) reflectivity properties of human tissue may be acquired as the biometric information, since the light reflectivity properties may differ depending on the age of the human tissues. Alternatively, the determination in step 309 may be supplemented with other types of information such as biometric information and contextual information that can be collected by the UE 101. Then, the age estimator 107 may take this additional information into consideration along with the calculated sums in determining the predefined age range to associate with the voice data. The contextual information may also be a log of software applications used by the user. For example, if the user is a young gamer, it is more likely that the user will be attracted to action games over puzzle games. So attraction to action games may indicate a younger user. The contextual information may include the person's frequent places to visit, which may be captured by a location positioning device such as a Global Positioning System device. For example, if the person frequently visits night clubs, then the age estimator 107 may link this with likelihood that the person is young, and adjust the probability values accordingly.

Further, the process 300 may take place in a server (not shown), instead of the UE 101. If the process 300 takes place in a server, then the voice data of the user of the UE 101 may not be acquired by the server unless the user agrees to this acquisition, for the purpose of privacy. In addition, the UE 101 may also be able to acquire voice data of other users in the contact list of the user of the UE 101, and determine their age ranges according to the process similar to the process 300. In this case, the UE 101 may also need a permission from other users to acquire their voice data.

This process is advantageous in that it automatically determines the age range to which the user belongs, by acquiring and analyzing the user's voice data. Thus, this process provides an easy way to determine the person's age range and thus provide a way for targeted advertisement and recommendations based on the age range. The age estimator 107 is a means for achieving this advantage.

Figure 4:
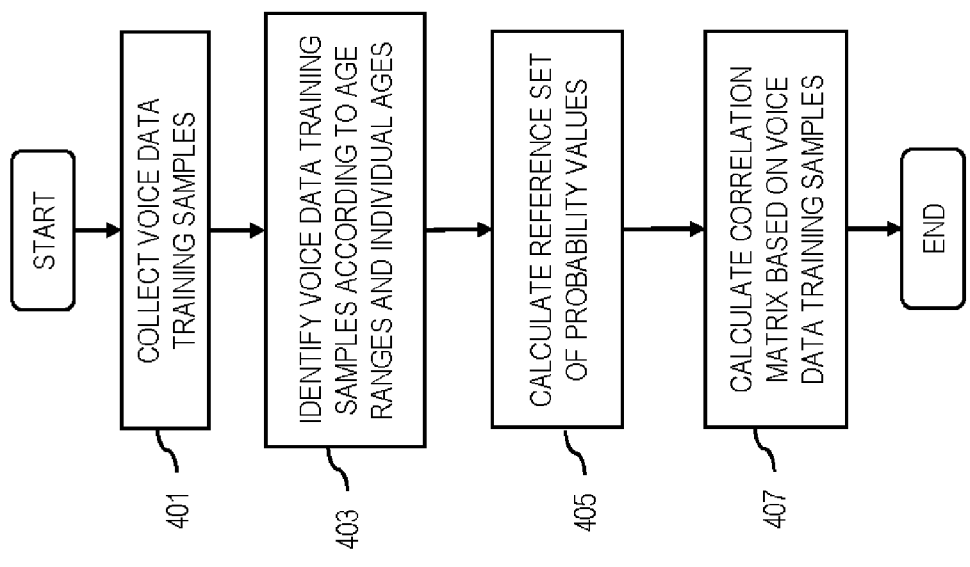
FIG. 4 is a flowchart of a process for training a statistical model and a correlation matrix used for determining a user age range, according to one embodiment.

FIG. 4 is a flowchart of a process for training a statistical model and a correlation matrix used for determining a user age range, according to one embodiment. The implementation of the approach described herein may include an offline training portion and an online recognition portion. The process 400 may be the offline training portion, whereas the process 300 may be the online recognition portion. In one embodiment, the age estimator 107 performs the process 400 and is implemented in, for instance, a chip set including a processor and a memory as shown FIG. 8. In step 401, the age estimator 107 directs the UE 101 to collect the voice data training samples. The training samples may include voice data corresponding to each of the predefined ranges and each of the individual ages within a life span. The training samples may also include information about the ages and age ranges corresponding to each of the voice data of the training samples. Further, the training samples may be collected from a group of individuals of different ages and age ranges. The training samples may be available in a server (not shown) for a download to the UE 101. Training samples may also be collected by the UE 101. Then, in step 403, the voice data training samples are identified according to age ranges and individual ages. Using the voice data training samples, the age estimator 107 calculates a reference set of probability values correlating the voice data with the predefined age ranges, as shown in step 405. Then, in step 407, a correlation matrix is calculated based on the voice data training samples.

This offline training taken place in steps 403 and 405 may be performed by training a statistical model, such as Gaussian mixture model (GMM) using training samples. Instead of GMM, other models such as artificial neural network, support vector machine (SVM) and a decision tree may be used. GMM may be built for all predefined age ranges using speech training data. As shown in the examples above, the predefined age ranges may be Children (0-15 years old), Teenager (16-20 years old), Young Adult (21-30 years old), Older Adult (31-45 years old), Senior (46-60 years old) and Elderly (60-130 years old). For each predefined age range and each individual age in the life span (0-130 years old), training samples are collected. The training samples may be voice data of people corresponding to each predefined age range.

The vector $x_n^j$ is an observation vector from a sample j for a predefined age range n, where n∈[1 ... N]. N is the number of predefined age ranges. Thus, in this example, N is 6 because there are six different predefined age ranges, and the predefined age ranges for the Child, Teenager, Young Adult, Old Adult, Senior and Elderly have n values of 1, 2, 3, 4, 5 and 6, respectively. Each GMM has k components. Then, the probability density function for d-dimensional observations is defined as follows:

$$P(x_n^j | \omega_n^k) = \frac{1}{\sqrt{2\pi}^d |\Sigma_k|^{\frac{1}{2}}} e^{-\frac{1}{2}(x_n^j - \mu_n^k)^T \Sigma_k^{-1}(x_n^j - \mu_n^k)} \quad (1)$$

where $\omega_n^k$ is the k-th component of mixture model $M_n$ for age range n, d is the dimension, $|\Sigma_k|$ is the determinant of covariance matrix, $\mu_n^k$ is the mean vector.

The probability of observation $\omega_n^k$ in dependence on the mixture model $M_n$ is computed as follows:

$$P(x_n^j | M_n) = \sum_{k=1}^{K} W_N^k P(x_n^j | \omega_n^k) \quad (2)$$

where $W_n^k$ is the k-th component weight.

With enough training samples, all parameters including $\mu_n^k$, $|\Sigma_k|$, and $W_n^k$ can be derived using Expectation-maximization algorithm.

When all models for the predefined age ranges are trained, for a sample x belonging to age r, the probabilities of the sample x belonging to the N predefined models $M_1 \ldots M_n$ can be calculated as $p_1 \ldots p_n$. The set of probabilities $p_1 \ldots p_n$ are the reference probabilities for correlating the voice data with the predefined age ranges.

Considering all constrains from samples in the entire life span R (131 in this example of 0-130 years), a N×R correlation matrix C can be determined, as discussed in step 405. The element $c_{1,j}$ of matrix C denotes the probability of the predefined age 1 falling into age j, wherein 1∈[1 ... N] and j∈[1 ... R].

The correlation matrix C is also trained. Discriminative training may be applied to optimize the correlation matrix. For a sample x belonging to age r, the probabilities of the sample x belonging to the N predefined models $M_1 \ldots M_n$ can be calculated as $[p_1, \ldots, p_n]$. The discriminative function D may be defined as the following:

$$g(x, i, C_{initial}) = \sum_{l=1}^{N} p_1 \times c_{i,1} \quad (3)$$

$$d(x, C_{initial}) = g(x, r, C_{initial}) - \max_{t=1L\ R, t \neq r} g(x, t, C_{initial}) \quad (4)$$

$$D(C_{initial}) = \sum_{x \in samples} d(x, C_{initial}) \quad (5)$$

Further, other models may also be used instead of or in addition to the correlation matrix. The models that may be used include probabilistic neural network and support vector machine.

This process is advantageous in that it trains the models using sample data with known parameters, before the models can be used in determination of the person's age. Thus, this process provides an accurate way to determine the person's age by taking sample data into consideration. The age estimator 107 is a means for achieving this advantage.

Figure 5:
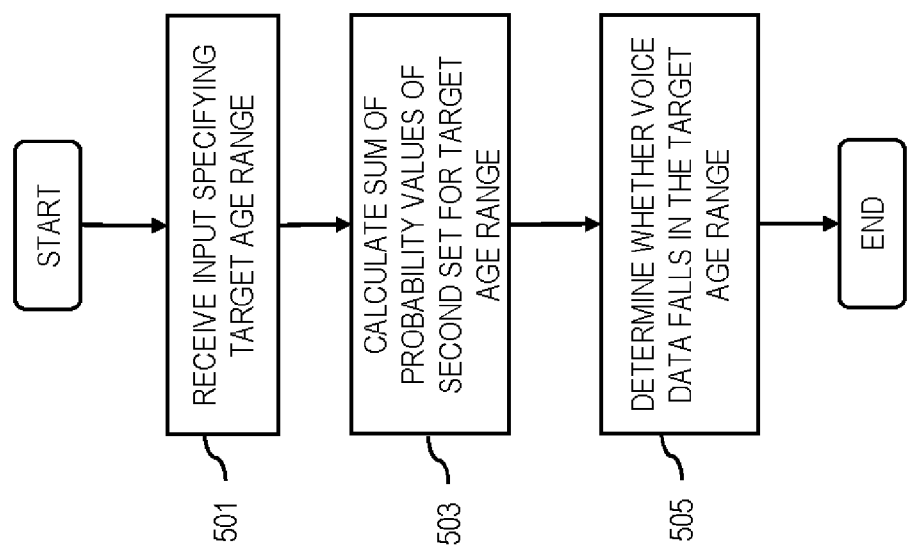
FIG. 5 is a flowchart of a process for determining whether a user's age falls within a target range, according to one embodiment.

FIG. 5 is a flowchart of a process for determining whether a user's age falls within a target range based on voice data, according to one embodiment. In one embodiment, the age estimator 107 performs the process 500 and is implemented in, for instance, a chip set including a processor and a memory as shown FIG. 8. The process 500 may take place any time after driving the second set of probability values in step 305. In step 501, the age estimator 107 receives an input specifying a target age range. According to the specified target age range, the age estimator 107 calculates the sum of the probability values of the second set for the target range, as shown in step 503. For example, if the specified target range is 30-60 years old, then the second set probability values for 30-60 years old are added together to calculate the sum. Then, in step 505, the age estimator 107 determines whether the voice data falls within the target age range based on the calculated sum.

This process may be used, for example, when services define preferred or required age ranges. For example, if a movie service showing violent movies requires the user to be 18 years old or older, for the life span of 130 years, then the sum of the probability values of the second set for the ages of 18-130 years is calculated. The age estimator may consider this sum to determine whether the voice data falls within this target age range of 18-130 years. If this sum is higher than a predetermined threshold value, then the age estimator 107 may determine that the voice data falls within the target age range and provide this service to the UE 101. Alternatively, the sum of the probability values of the second set within the target age range may be compared with the sum of the probability values of the second set outside the target age range. In this example, if the sum of the probability values of the second set for the target age range of 18-130 years is greater than the sum of the probability values of the second set for the range of 0-17 years old, then the age estimator 107 may determine that the voice data falls within the target age range.

Figures 6A, 6B:
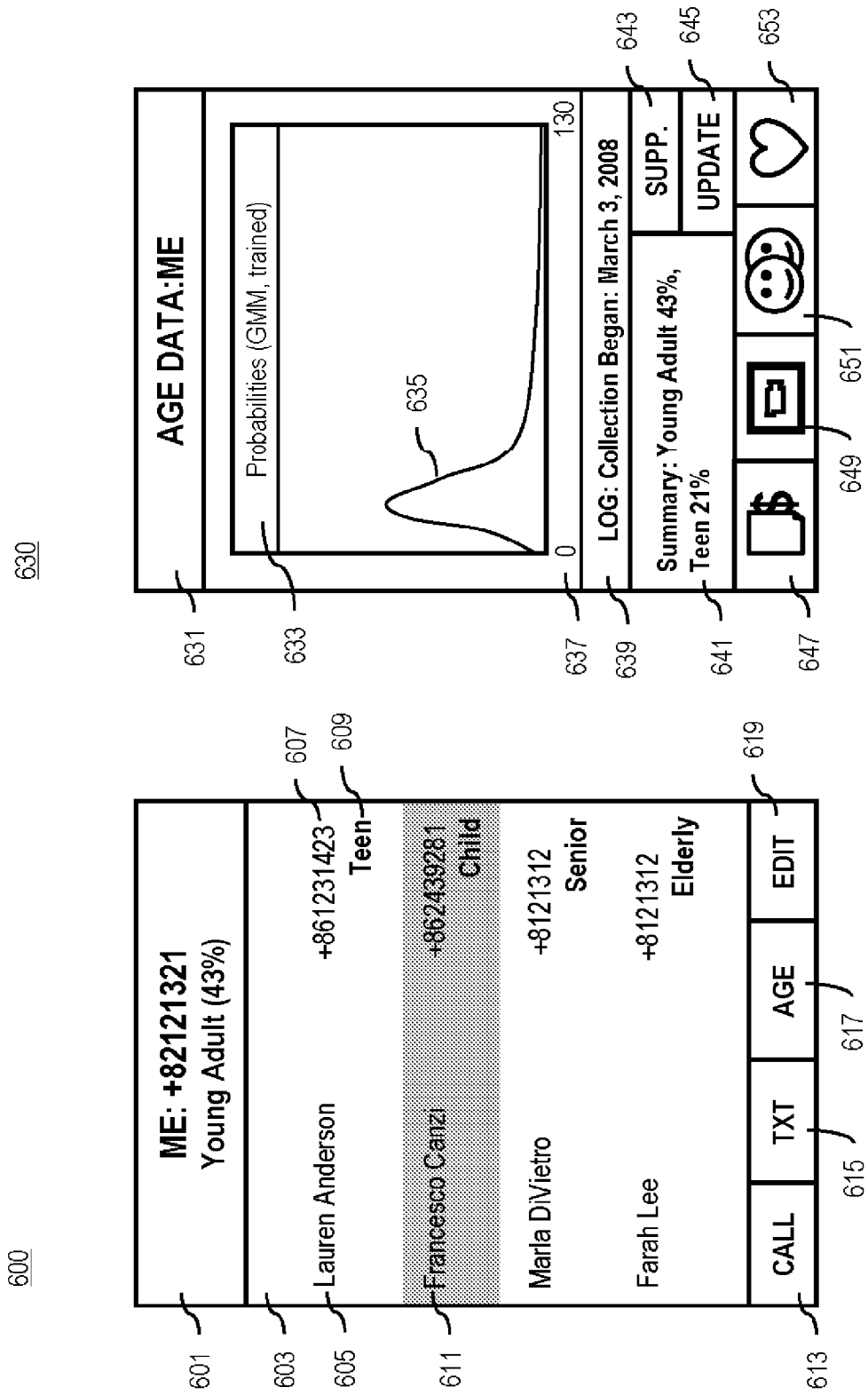
FIGS. 6A-6B are diagrams of user interfaces utilized in the processes of FIG. 3, according to various embodiments.

FIGS. 6A-6B are diagrams of user interfaces utilized in the processes of FIG. 3, according to various embodiments. FIG. 6A is a contact list user interface 600 showing a contact list, according to one embodiment. The information panel 601 shows that the user interface 600 is showing a contact list of the user (i.e., ME). The information panel 601 also shows that the user's age is within the age range "Young Adult" and the probability of the user being that age range is 43%. The contact list 603 has a list of people that the user can contact. For each contact, a name of the person 605, the person's phone number 607, and an age range of the person 609 are shown. The age range of the people on the contact list may be provided by the people on the contact list or may be estimated based on the voice data of the people on the contact list. Within the contact list 603, the user may move the highlighted bar up and down to select a person to contact. In this case, the highlighted bar 611 is on "Lauren Anderson." The call option 613 or the text option 615 may be selected to allow the user to make a phone call or send a text message to the selected person. The age option 617 may be selected to view details about the age range of the user. The edit option 619 allows the user to change contact information of the selected person.

FIG. 6B is an age data user interface 630 showing details about the user's age, according to one embodiment. The age data user interface 630 may be activated when the age option 617 in FIG. 6A is selected. The information panel 631 shows that the user interface is showing the age data of the user (i.e., ME). The age plot panel 633 shows that a graphical plot of probabilities is displayed, and GMM is used to determine the probabilities. The age plot panel 733 also shows that the model used to determine the probabilities is trained by sample data. The probability plot 635 shows probabilities from the second set of probability values obtained after step 305, corresponding to each individual age ranging from 0-130 years. The x-axis 637 of the plot is the age ranging from 0-130.

Further, a time regarding collection of the voice data can be shown in the data collection panel 639, which shows that the voice data has been collected since Mar. 3, 2008, in this example. The data collection panel 639 may also be a selectable option, wherein upon selection of the data collection panel 639, a detailed log of the collected data may be displayed. The summary panel 641 shows top two age ranges with the highest sum of probability values. In this example, the top two age ranges are Young Adult with 43% probability and Teen with 21% probability. This is visible in the probability plot 635 as well, since the probability plot 635 shows high probability values for the ages of the Teen and Young Adult. The supplementary information option 643 may be selected to determine whether to add additional information such as biometric information and contextual information, in determination of the age range. The update option 645 allows updating the age range by considering the voice data that are collected until recently.

On the bottom of the character profile user interface 630, recommendations based on the user's age range are available. The advertisement option 647 suggests advertisements that the user may be interested, based on the age of the user, and the media option 649 suggests media based on the age range of the user. The friend option 651 suggests possible users who can be friends based on the age of the user, and the date option 653 suggests possible dates for the user of the UE 101 based on the age of the user. Additional options for recommendations may be selected in a separate user interface (not shown), wherein the additional options may include recommendations on applications, documents, products, contents, jobs, etc.

The processes described herein for determining a user age range may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
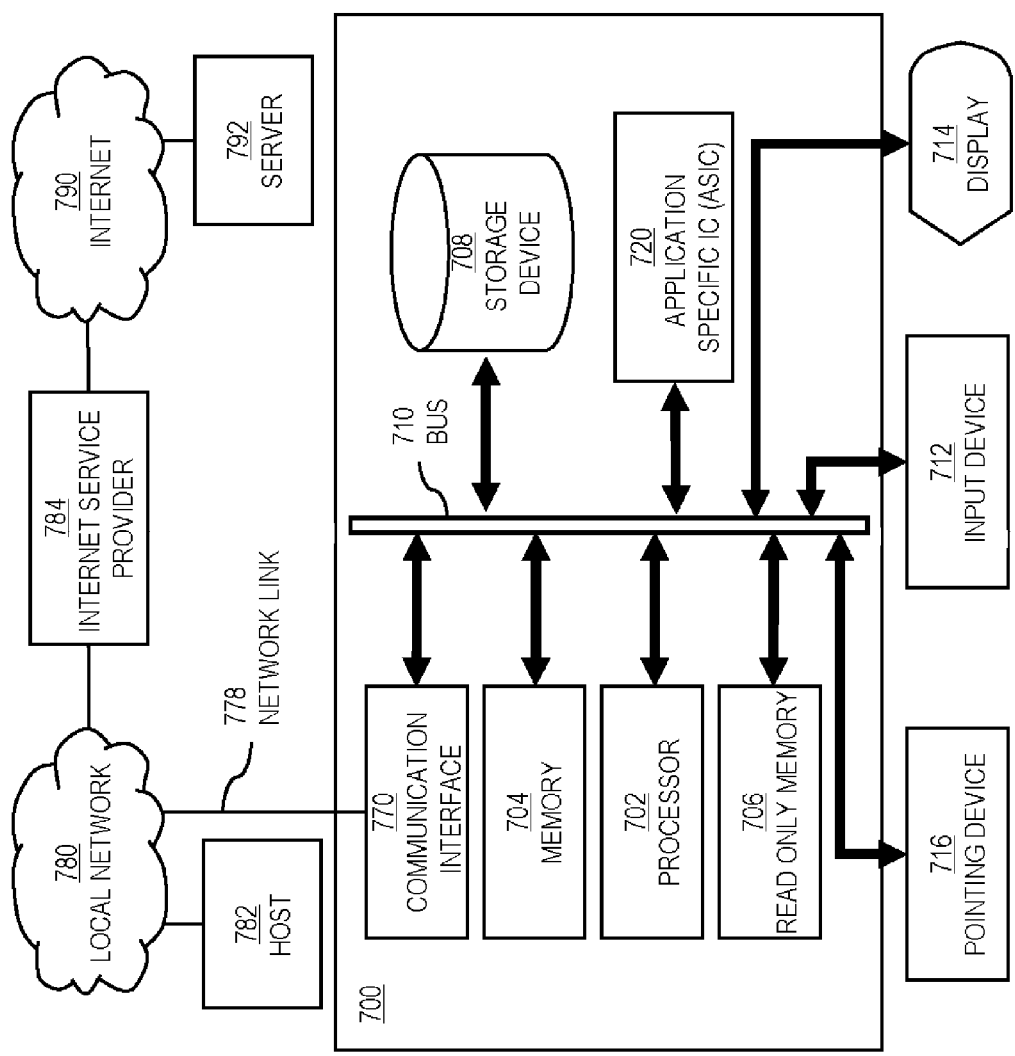
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to determine a user age range as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of determining a user age range.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to determining a user age range. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for determining a user age range. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for determining a user age range, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for determining a user age range.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
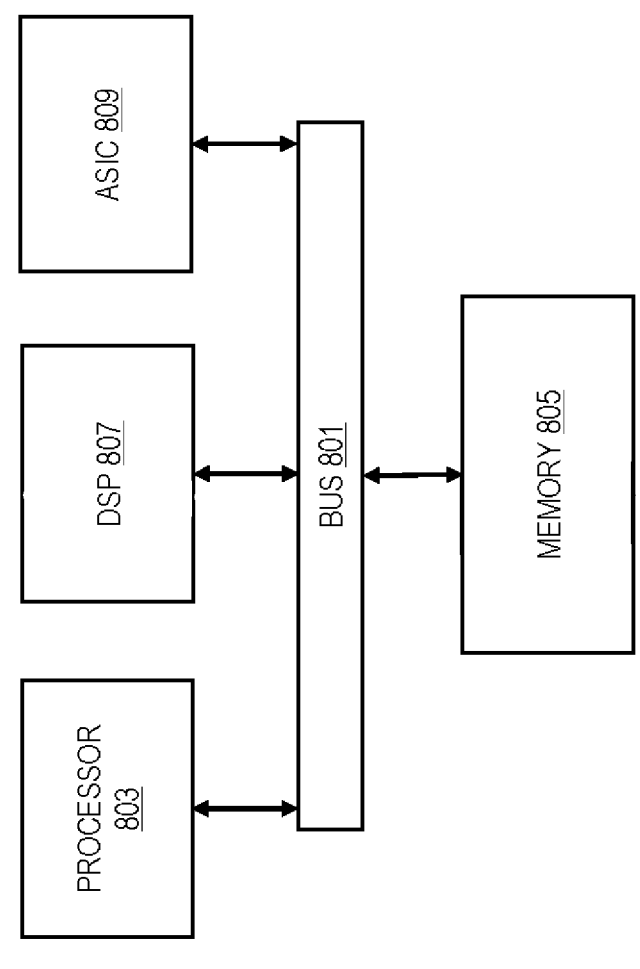
FIG. 8 is a diagram of a chip set that can be used to implement an embodiment of the invention.

FIG. 8 illustrates a chip set or chip 800 upon which an embodiment of the invention may be implemented. Chip set 800 is programmed to determine a user age range as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of services. Chip set or chip 800, or a portion thereof, constitutes a means for performing one or more steps of determining a user age range.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to determine a user age range. The memory 805 also stores the data associated with or generated by the execution of the inventive steps.

Figure 9:
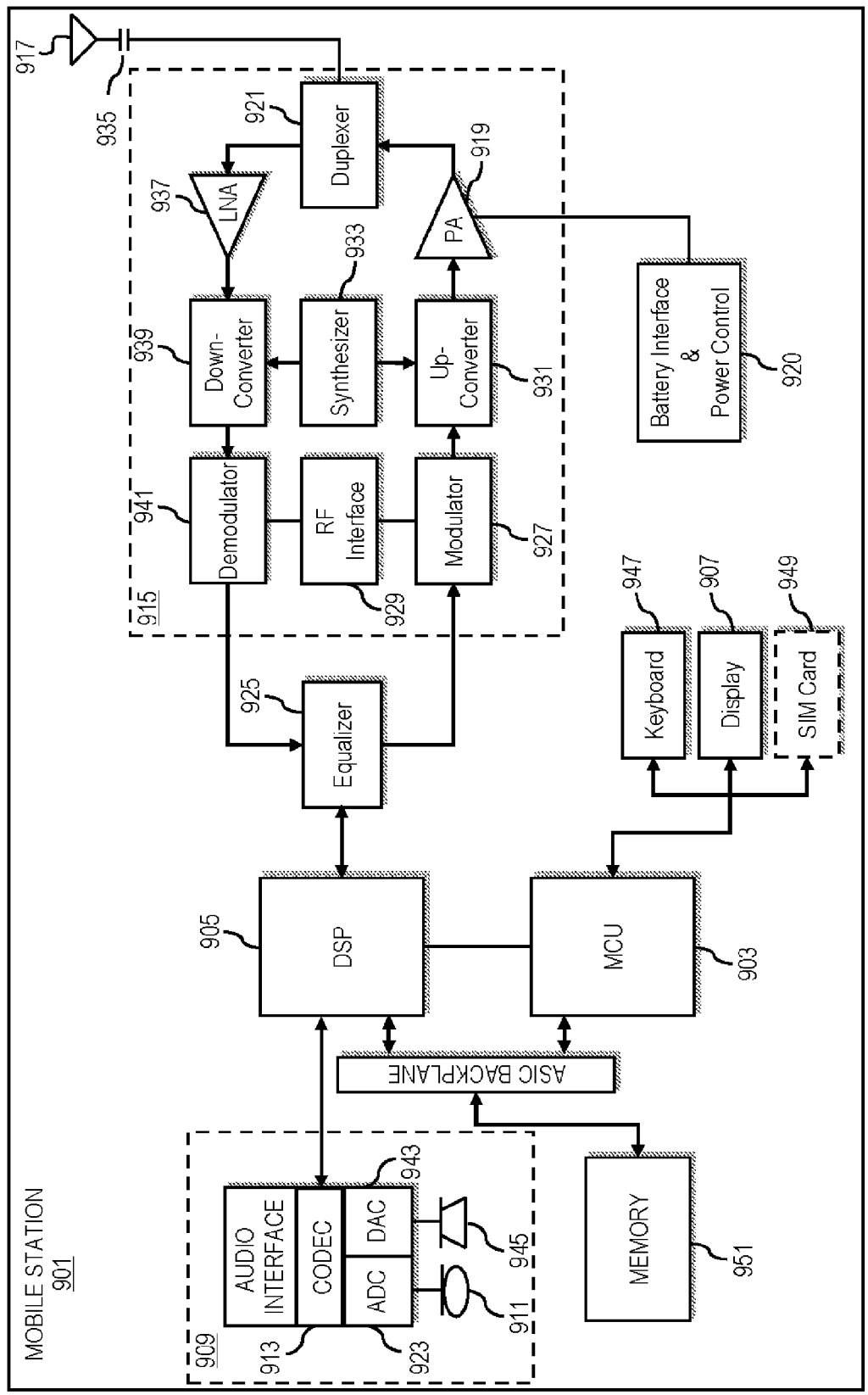
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 900, or a portion thereof, constitutes a means for performing one or more steps of determining a user age range. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of determining a user age range. The display 9 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to determine a user age range. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   causing, at least in part, acquisition of voice data at an age estimator, wherein the age estimator comprises an input module and a computation module;
   calculating a first set of probability values using the computation module, wherein each of the probability values represents a probability that the voice data is in a respective one of a plurality of predefined age ranges, and the predefined age ranges are segments of a lifespan;
   deriving a second set of probability values using the computation module, by applying a correlation matrix to the first set of probability values, wherein the correlation matrix associates the first set of probability values with probabilities of the voice data matching individual ages over the lifespan;
   for each of the predefined age ranges, calculating a sum of the probabilities in the second set of probability values corresponding to the individual ages within the respective predefined age ranges using the computation module; and
   determining the predefined age range to associate with the voice data using the computation module based, at least in part, on the calculated sums of the probabilities.

2. A method of claim 1, further comprising:
   receiving an input specifying a target age range using the input module;
   calculating another sum of the probabilities in the second set of probability values corresponding to the individual ages within the target age range using the computation module; and
   determining whether the voice data is associated with an age within the target age range based, at least in part, on the another sum using the computation module.

3. A method of claim 1, further comprising:
   collecting a plurality of voice data training samples;
   identifying each of the plurality of voice data training samples according to the predefined age ranges and the individual ages in the lifespan;
   calculating a reference set of probability values for correlating the voice data with the predefined age ranges using the computation module; and
   calculating the correlation matrix using the computation module, based on the voice data training samples.

4. A method of claim 3, further comprising:
   optimizing the correlation matrix via discriminative training using the computation module.

5. A method of claim 1, wherein the calculating the first set of probability values, the second set of probability values, or both are performed using a statistical model including a Gaussian mixture model, an artificial neural network, a support vector model, a decision tree or any combination thereof.

6. A method of claim 1, wherein each element of the correlation matrix represents a probability that one of the predefined age ranges falls into one of the individual ages.

7. A method of claim 1, further comprising:
   causing, at least in part, acquisition of biometric information, contextual information, or a combination thereof using the input module,
   wherein the determining of the predefined age range to associate with the voice data is further based, at least in part, on the biometric information, the contextual information, or a combination thereof.

8. A method of claim 1, further comprising:
   selectively providing advertisements, recommendations, reports, notices, messages, media or any combination thereof, based on the determined predefined age range.

9. An apparatus comprising:
   at least one processor; and
   at least one memory including computer program code, the at least one memory and the computer program code configured to, with the at least one processor, cause the apparatus to perform at least the following,
   cause, at least in part, acquisition of voice data at an age estimator, wherein the age estimator comprises an input module and a computation module;
   calculate a first set of probability values using the computation module, wherein each of the probability values represents a probability that the voice data is in a respective one of a plurality of predefined age ranges, and the predefined age ranges are segments of a lifespan;

derive a second set of probability values using the computation module, by applying a correlation matrix to the first set of probability values, wherein the correlation matrix associates the first set of probability values with probabilities of the voice data matching individual ages over the lifespan;

for each of the predefined age ranges, calculate a sum of the probabilities in the second set of probability values corresponding to the individual ages within the respective predefined age ranges using the computation module; and determine the predefined age range to associate with the voice data using the computation module based, at least in part, on the calculated sums of the probabilities.

10. An apparatus of claim 9, wherein the apparatus is further caused, at least in part, to:

receive an input specifying a target age range using the input module;

calculate another sum of the probabilities in the second set of probability values corresponding to the individual ages within the target age range using the computation module; and determine whether the voice data is associated with an age within the target age range based, at least in part, on the another sum using the computation module.

11. An apparatus of claim 9, wherein the apparatus is further caused, at least in part, to:

collect a plurality of voice data training samples;

identify each of the plurality of voice data training samples according to the predefined age ranges and the individual ages in the lifespan;

calculate a reference set of probability values for correlating the voice data with the predefined age ranges using the computation module; and calculate the correlation matrix using the computation module, based on the voice data training samples.

12. An apparatus of claim 11, wherein the apparatus is further caused, at least in part, to:

optimize the correlation matrix via discriminative training using the computation module.

13. An apparatus of claim 9, wherein the calculating the first set of probability values, the second set of probability values, or both are performed using a statistical model including a Gaussian mixture model, an artificial neural network, a support vector model, a decision tree or any combination thereof.

14. An apparatus of claim 9, wherein each element of the correlation matrix represents a probability that one of the predefined age ranges falls into one of the individual ages.

15. An apparatus of claim 9, wherein the apparatus is further caused, at least in part, to:

cause, at least in part, acquisition of biometric information, contextual information, or a combination thereof using the input module, wherein the determining of the predefined age range to associate with the voice data is further based, at least in part, on the biometric information, the contextual information, or a combination thereof.

16. An apparatus of claim 9, wherein the apparatus is further caused, at least in part, to:

selectively provide advertisements, recommendations, reports, notices, messages, media or any combination thereof, based on the determined predefined age range.

17. An apparatus of claim 9, wherein the apparatus is a mobile phone further comprising:

user interface circuitry and user interface software configured to facilitate user control of at least some functions of the mobile phone through use of a display and configured to respond to user input; and a display and display circuitry configured to display at least a portion of a user interface of the mobile phone, the display and display circuitry configured to facilitate user control of at least some functions of the mobile phone.

18. A non-transitory computer-readable storage medium carrying one or more sequences of one or more instructions which, when executed by one or more processors, cause an apparatus to at least perform the following steps:

causing, at least in part, acquisition of voice data at an age estimator, wherein the age estimator comprises an input module and a computation module;

calculating a first set of probability values using the computation module, wherein each of the probability values represents a probability that the voice data is in a respective one of a plurality of predefined age ranges, and the predefined age ranges are segments of a lifespan;

deriving a second set of probability values using the computation module, by applying a correlation matrix to the first set of probability values, wherein the correlation matrix associates the first set of probability values with probabilities of the voice data matching individual ages over the lifespan;

for each of the predefined age ranges, calculating a sum of the probabilities in the second set of probability values corresponding to the individual ages within the respective predefined age ranges using the computation module; and determining the predefined age range to associate with the voice data using the computation module based, at least in part, on the calculated sums of the probabilities.

19. A non-transitory computer-readable storage medium of claim 18, wherein the apparatus is caused, at least in part, to further perform:

receiving an input specifying a target age range using the input module;

calculating another sum of the probabilities in the second set of probability values corresponding to the individual ages within the target age range using the computation module; and determining whether the voice data is associated with an age within the target age range based, at least in part, on the another sum using the computation module.

20. A non-transitory computer-readable storage medium of claim 18, wherein the apparatus is caused, at least in part, to further perform:

collecting a plurality of voice data training samples;

identifying each of the plurality of voice data training samples according to the predefined age ranges and the individual ages in the lifespan;

calculating a reference set of probability values for correlating the voice data with the predefined age ranges using the computation module; and calculating the correlation matrix using the computation module, based on the voice data training samples.

* * * * *